(12) United States Patent
Selvaganapathy et al.

(10) Patent No.: US 10,772,144 B2
(45) Date of Patent: Sep. 8, 2020

(54) SWITCHING OF FLOW SEPARATION FOR NEW RADIO IN DUAL CONNECTIVITY

(71) Applicant: Nokia Technologies Oy, Espoo (FI)

(72) Inventors: Srinivasan Selvaganapathy, Bangalore (IN); Amaanat Ali, Espoo (FI)

(73) Assignee: Nokia Technologies Oy, Espoo (FI)

( * ) Notice: Subject to any disclaimer, the term of this patent is extended or adjusted under 35 U.S.C. 154(b) by 12 days.

(21) Appl. No.: 15/618,704

(22) Filed: Jun. 9, 2017

(65) Prior Publication Data

US 2017/0374672 A1 Dec. 28, 2017

(30) Foreign Application Priority Data

Jun. 28, 2016 (IN) .............................. 201641022177

(51) Int. Cl.
*H04W 72/08* (2009.01)
*H04W 88/02* (2009.01)
(Continued)

(52) U.S. Cl.
CPC ........... *H04W 76/15* (2018.02); *H04W 76/34* (2018.02)

(58) Field of Classification Search
None
See application file for complete search history.

(56) References Cited

U.S. PATENT DOCUMENTS

| 2008/0320149 | A1* | 12/2008 | Faccin | ................. | H04W 76/22 |
| | | | | | 709/228 |
| 2014/0153547 | A1* | 6/2014 | Klingenbrunn | ....... | H04W 36/30 |
| | | | | | 370/332 |

(Continued)

FOREIGN PATENT DOCUMENTS

| EP | 2772093 A2 | 9/2014 |
| EP | 2787763 A1 | 10/2014 |

(Continued)

OTHER PUBLICATIONS

"Circuit Switched Fallback CSFB—Mobile Terminating Call in Active Mode, No PS HO", LTE and Beyond, Retrieved on Mar. 28, 2017, Webpage available at : http://www.lteandbeyond.com/2013/09/CSFB-Mobile-Terminating-Call-in-Active-mode.html.

(Continued)

*Primary Examiner* — Ruihua Zhang
(74) *Attorney, Agent, or Firm* — Mintz Levin Cohn Ferris Glovsky and Popeo, P.C.

(57) ABSTRACT

Methods and apparatus, including computer program products, are provided for switching flow separation in dual connectivity. In some example embodiments, there may be provided a method that includes suspending, at the user equipment, at least one bearer and corresponding quality of service filter, when an access node is added as a secondary base station providing dual connectivity to the user equipment; switching, by the user equipment and in response to the added secondary base station, one or more packets to at least a secondary bearer at the added secondary base station; and reverting, by the user equipment, to the suspended at least one bearer and corresponding quality of service filter, when the added secondary base station is released as a connection at the user equipment. Related systems, methods, and articles of manufacture are also described.

18 Claims, 4 Drawing Sheets

(51) Int. Cl.
  *H04W 88/06* (2009.01)
  *H04W 92/20* (2009.01)
  *H04W 76/15* (2018.01)
  *H04W 76/34* (2018.01)

(56) References Cited

U.S. PATENT DOCUMENTS

| | | | |
|---|---|---|---|
| 2015/0358866 A1 | 12/2015 | Xu et al. | |
| 2016/0029235 A1* | 1/2016 | Kim | H04W 24/08 370/252 |
| 2016/0323805 A1* | 11/2016 | Ryu | H04W 36/0055 |

FOREIGN PATENT DOCUMENTS

| | | |
|---|---|---|
| EP | 2922363 A1 | 9/2015 |
| WO | 2013/063429 A2 | 5/2013 |
| WO | 2015/108291 A1 | 7/2015 |
| WO | 2015/115992 A1 | 8/2015 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300, V12.6.0, Jun. 2015, pp. 1-254.

"3rd Generation Partnership Project; Technical Specification Group Radio Access Network; Study on Small Cell enhancements for E-UTRA and E-UTRAN; Higher layer aspects (Release 12)", 3GPP TR 36.842, V12.0.0, Dec. 2013, pp. 1-71.

"3rd Generation Partnership Project; Technical Specification Group Radio Access Network; Scenarios and requirements for small cell enhancements for E-UTRA and E-UTRAN (Release 13)", 3GPP TR 36.932, V13.0.0, Dec. 2015, pp. 1-14.

"New SID Proposal: Study on New Radio Access Technology", 3GPP TSG RAN Meeting #71, RP-160671, Agenda Item: 9.1, NTT Docomo, Mar. 7-10, 2016, 8 pages.

"3rd Generation Partnership Project; Technical Specification Group Radio Access Network; Study on Scenarios and Requirements for Next Generation Access Technologies;(Release 14)", 3GPP TR 38.913, V0.3.0, Mar. 2016, pp. 1-30.

"Dual Connectivity Between LTE And The New Rat", 3GPP TSG-RAN WG3 Meeting #91bis, R3-160739, Agenda Item: 10.3.2, Nokia, Apr. 11-15, 2016, 4 Pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 13)", 3GPP TS 36.300, V13.2.0, Dec. 2015, pp. 1-290.

3GPP, "Technical Specification Group Core Network and Terminals; IP multimedia call control protocol based on Session Initiation Protocol (SIP) and Session Description Protocol (SDP); Stage 3 (Release 7)," 3rd Generation Partnership Project, 3GPP TS 24.229 V7.2.0, Dec. 2005, (319 pages).

3GPP, "Technical Specification Group Services and System Aspects; IP Multimedia Subsystem (IMS); Stage 2 (Release 2)," 3rd Generation Partnership Project, 3GPP TS 23.228 V 7.2.0, Dec. 2005 (192 pages).

3GPP, "Technical Specification Group Services and System Aspects; Voice Call Continuity between CS and IMS Study (Release 7)," 3rd Generation Partnership Project, 3GPP TR 23.806, V7.0.0, Dec. 2005, (153 pages).

3GPP, "Technical Specification Group Services and System Aspects; Voice Call Continuity between CS and IMS; Stage 2 (Release 7)," 3rd Generation Partnership Project, 3GPP TS 23.203 V0.3.0, Feb. 2006, (22 pages).

* cited by examiner

SWITCHING OF FLOW SEPARATION FOR NEW RADIO IN DUAL CONNECTIVITY

FIELD

The subject matter described herein relates wireless mobility.

BACKGROUND

Dual Connectivity refers to the operation a user equipment, such as a smart phone, a tablet, and/or the like, configured to use the radio resources provided by two distinct resource schedulers that are located in two base stations such as evolved Node B base stations, which are connected via a link such as a backhaul over an interface such as the X2 interface (see, for example, 3GPP TR 36.842 [59] and TR 36.932 [60]). The evolved Node B base station that is in dual connectivity with a given user equipment (UE) may act as a master evolved Node B (MeNB) base station or as a secondary evolved Node B (SeNB) base station. While in dual connectivity, the UE may be connected to a single MeNB and a single SeNB. In the case of E-UTRAN, there may be provided dual connectivity that supports Long Term Evolution (LTE)-Wireless Local Area network (WLAN) aggregation (LWA). When in dual connectivity, the base stations, such as the MeNB and SeNB, may use the same or different radio access technologies.

SUMMARY

Methods and apparatus, including computer program products, are provided for switching QoS flow separation for dual connectivity.

In some example embodiments, there may be provided a method that includes suspending, at the user equipment, at least one bearer and corresponding quality of service filter, when an access node is added as a secondary base station providing dual connectivity to the user equipment; switching, by the user equipment and in response to the added secondary base station, one or more packets to at least a secondary bearer at the added secondary base station; and reverting, by the user equipment, to the suspended at least one bearer and corresponding quality of service filter, when the added secondary base station is released as a connection at the user equipment.

In some variations, one or more of the features disclosed herein including the following features can optionally be included in any feasible combination. The reverting may further include resuming use of the suspended at least one bearer and corresponding quality of service filter to provide quality of service flow differentiation. In response to the switching, one or more packets may be routed to at least the secondary bearer at the added secondary base station. In response to the reverting, one or more packets may be routed to the suspended at least one bearer and corresponding quality of service filter, wherein the suspended at least one bearer is an active bearer. The user equipment may store the suspended at least one bearer and corresponding quality of service filter to enable a return to the suspended at least one bearer when the added secondary base station is released. The access node may include a new radio access technology node configured to provide quality of service flow differentiation via the secondary bearer. The user equipment may receive an indication of the addition of the secondary base station configured for flow differentiation. The user equipment may send a measurement report indicating the access node is a candidate for addition to a secondary cell group for dual connectivity. The at least one secondary bearer may include a default bearer and/or a non-guaranteed bit rate bearer. The at least one secondary bearer may include at least one moved bearer, wherein the at least one moved bearer is moved to and/or created at the secondary base station.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Like labels are used to refer to same or similar items in the drawings.

DETAILED DESCRIPTION

In 3GPP, a new study item (RP-160671, Study on New Radio Access Technology has been started to introduce a new radio (NR) access technology. This NR radio access node technology may operate from about 4 Ghz to about 100 GHz to provide an enhanced mobile broadband experience with higher throughput. For example, the NR node may operate as a secondary access point serving one or more user equipment or devices in a coverage area. Moreover, the NR node may support use cases enabling enhanced mobile broadband, massive machine-type-communications, and/or ultra-reliable and low latency communications (see, e.g., 3GPP TR38.913, Study on Scenarios and Requirements for Next Generation Access Technologies). This NR node technology may have a smaller coverage area, when compared to current cellular access technologies.

The NR nodes may be deployed as so-called "hotspots," such as access points, with an LTE node providing an additional coverage layer. For example, the LTE node, such as a master eNB base station (MeNB), may provide a macro or primary cell coverage area, while the NR node may provide a secondary node and a corresponding secondary cell coverage area. Internetworking may also be provided between the LTE node and the NR node by providing dual connectivity between the LTE node and the NR node (see, e.g., 3GPP, 3GPP TSG-RAN WG3 Meeting #9 ibis, R3-160739, Bangalore, India, 11-15 Apr. 2016, Dual connectivity between LTE and the New RAT).

Figure 1:
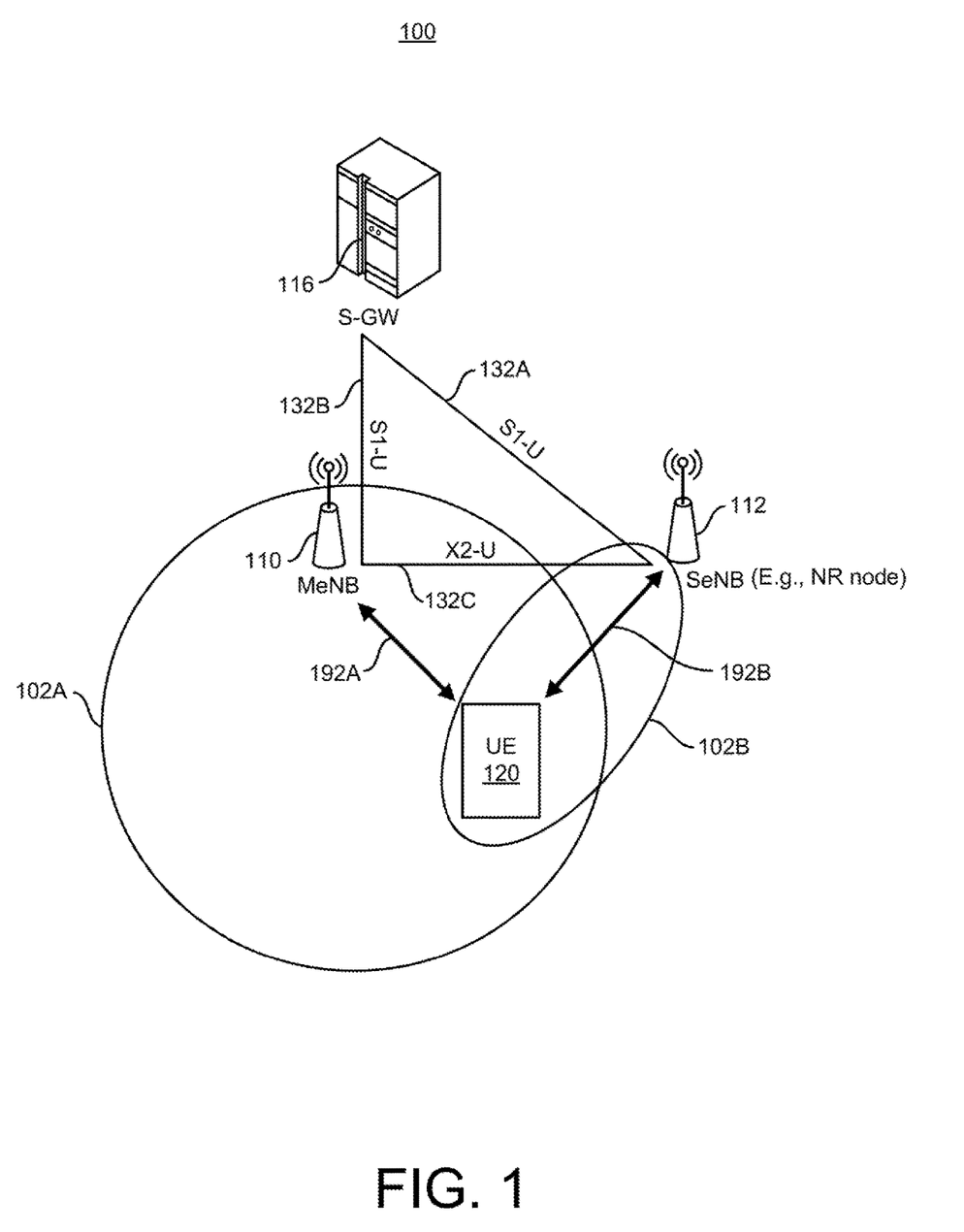
FIG. 1 depicts an example of a system including user plane connectivity that supports dual connectivity, in accordance with some example embodiments.

FIG. 1 depicts a system 100 showing user plane connectivity supporting dual connectivity, in accordance with some example embodiments. As shown at FIG. 1, the user equipment (UE) 120 may be configured for dual connectivity. When this is the case, the user equipment 120 may be served via downlink 192A (and/or an uplink) by a primary or master node, such as a master evolved Node B base station (MeNB) 110. The user equipment 120 in dual connectivity may also be served by secondary nodes, such as a NR node 112 via downlink 192B (and/or an uplink)

In the example of FIG. 1, the user equipment is in the primary cell (Pcell) 102A served by the master evolved Node B base station 110 and the secondary cell (Scell) 102B of a NR node 112.

The system 100 may further include other network nodes such as a serving gateway (SGW) 116. The serving gateway 116 may support a user plane interface, such as S1-U 132A-B with base stations, such as eNodeB type base stations and/or other types of nodes. The serving gateway 116 may also support a control plane interface to a mobility management entity 105.

Figure 2:
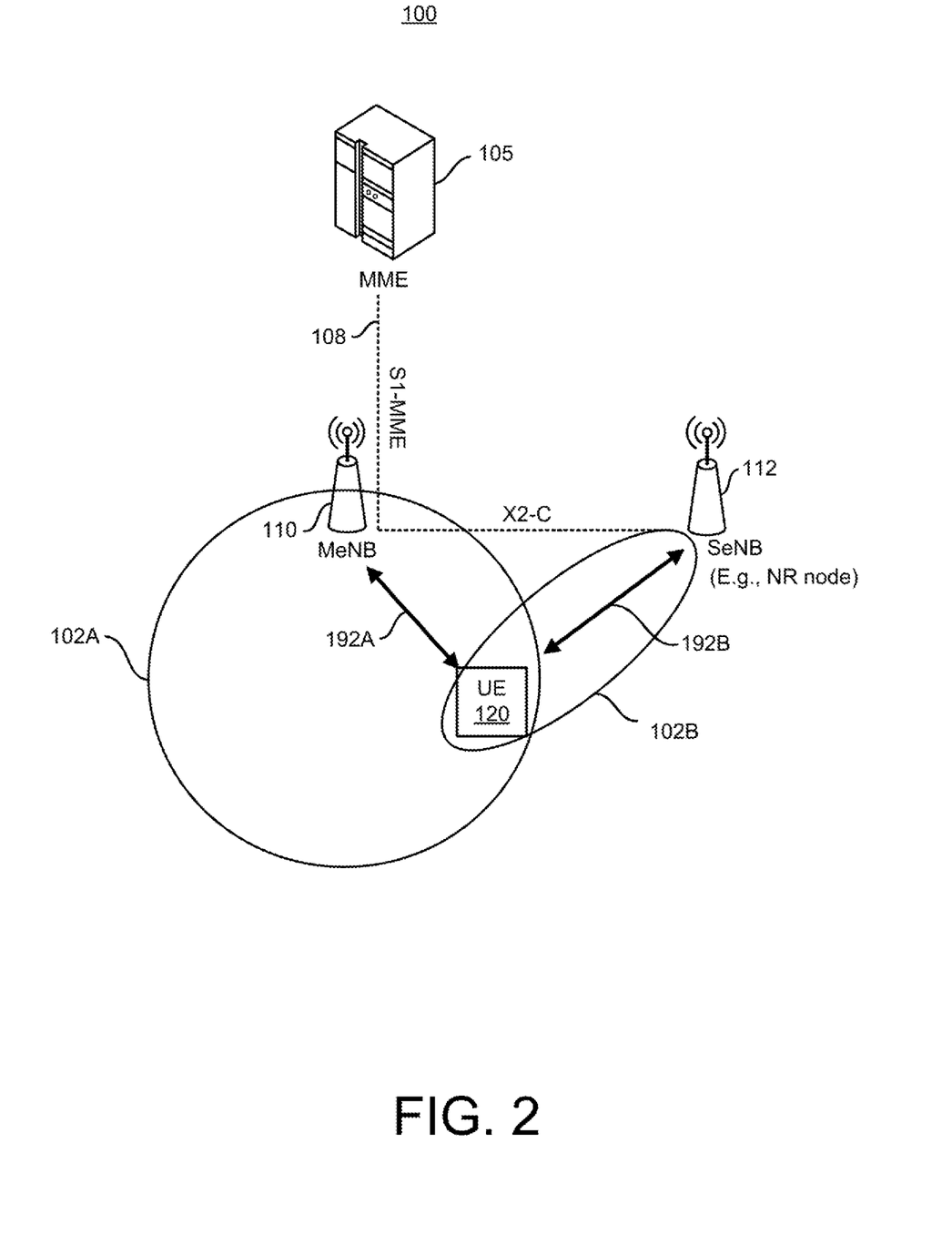
FIG. 2 depicts an example of a system including control plane connectivity that supports dual connectivity, in accordance with some example embodiments.

FIG. 2 depicts a block diagram of the S1 control plane (S1-C) signaling 108 for providing dual connectivity, in accordance with some example embodiments. In the example of FIG. 2, the S1-C interface 108 between the mobility management entity (MME) 105 and the master eNB base station (MeNB) may be used as a control plane for controlling the dual connectivity provided to user equipment 120. The control plane signaling may also include an interface between the MME 105 and SGW 116. In the case of dual connectivity, there may different bearer options, including a split bearer option and a secondary cell group (SCG) bearer option. For split bearers for example, the S1-U interface 132B connection to the SGW 116 may be terminated in the MeNB 110, and the MeNB may split some of the user plane traffic toward the SeNB base station 112 via an X2-U 132C interface. In the case of secondary cell group (SCG) bearers for example, the secondary evolved Node B base station 110 may be directly connected to the core (for example, the SGW 116 via the S1-U interface 132A), while the MeNB 110 may not be not involved in the transport of user plane data for this type of bearer(s) over the Uu interface.

As part of the NR node system framework, the NR node such as NR node 112 may be configured to handle quality of service (QoS) differently, when compared to LTE nodes such as MeNB 110. For example, the NR node may be characterized by one or more of the following:

- two or more fixed radio bearers may be created, as part of radio resource control (RRC) connection setup or user equipment context creation for the radio interface (the quantity of fixed radio bearers may be dependent on the QoS policy of each subscriber).
- a single bearer may be used towards the core network element; and
- an NR node may determine the mapping of incoming packets to the radio bearers, as part of QoS flow separation, and this flow separation may be performed in accordance with a downloaded QoS policy or QoS subscription information (this policy or subscription information may be provided by the core-network or in other ways as well).

The NR node such as NR node 112 may, as noted, have a single bearer for all non-Guaranteed Bit Rate (nGBR) bearer types for a given access network, such as an access point name (APN). Furthermore, the radio layers at the NR node (and/or the UE) may differentiate the multiple flows (e.g., of packets) within this single bearer (for example, using a traffic flow template, TFT, like mechanism). However, in the case of an LTE node such as MeNB 110 for example, QoS flow separation may occur at the core network, such as the Evolved Packet Core (EPC), and multiple Evolved Packet System (EPS) bearers may be created to provide QoS flow separation, in which at least one EPS bearer may be configured as a default bearer. EPS bearer may provide flow separation (e.g., differentiation of packets for QoS purposes), and the EPS bearer may include a radio bearer (e.g., S1 bearer and S5/S8 bearer) between the UE and the EPC (e.g., a serving gateway and/or packet gateway). In the case of a default bearer, packets at the EPC or UE (which do not match a packet filter criteria for QoS flows) may be mapped to the default bearer.

In some example embodiments, the present disclosure may provide an enhanced dual connectivity procedure for a UE operating in dual connectivity between a macro base station and a NR node serving a secondary base station. Moreover, the UE may operate and thus move between the macro base station (e.g., a macro evolved Node B base station (MeNB) which operates, as noted, based on QoS flow separation at the EPC) and the NR node (e.g., a secondary evolved Node B base station (SeNB) which operates based on NR based QoS flow separation).

In some example embodiments, the EPC may maintain or preserve bearers, such as EPS bearers and the corresponding QoS treatment, to allow the UE to return to the EPS bearers, when the UE releases the NR node and the bearer and QoS treatment provided at the NR node. In this way, the present disclosure may provide so-called "tight interworking" between for example the macro eNB macro base station (which may be in accordance with LTE) and the NR node (which may be configured for NR based flow separation in support of QoS) operating as a secondary base station for dual connectivity. Moreover, the maintenance of EPS bearers at the EPC, eNB base station, and/or UE may reduce signaling load (end-to-end) associated with mobility when the UE moves between the MeNB and NR (e.g., reducing some of the termination and setup signaling for radio bearer and EPS bearer resources).

In some example embodiments, when a secondary cell group (e.g., NR node 112) operating as a secondary base station in dual connectivity) is added, the macro base station (e.g., MeNB base station 110) may maintain the EPS bearers and corresponding radio bearers, while the UE and the EPC may suspend use of these EPS and radio bearers (and the QoS being applied to the bearers). In some example embodiments, the addition of the secondary cell group such as NR node 112 may trigger the EPC (e.g., SGW 116 and the like) and the UE 120 to switch the QoS flow differentiation to the NR node 112 operating as a secondary cell group/secondary access point for dual connectivity. In some example embodiments, when the NR node/secondary cell group is released, the EPC and UE may resume use of the EPC bearers by at least switching the packet flow differentiation from the NR node back to the UE and EPC (via the macrocell/MeNB base station). The MeNB base station may, however, not be aware of the switching scenario, but the MeNB may provide, via a message such as an S1 message, the indication of the addition of NR node as the secondary cell group.

To illustrate, the NR node may, in some example embodiments, be configured to differentiate packet flows for purposes of QoS flow differentiation. When this NR node is added as secondary cell group (SCG, for example, a secondary base station for dual connectivity) to an existing macrocell connection (e.g., LTE RRC connection), the EPC may disable packet flow filtering and may route the packets to a default bearer (at the NR node). The EPC may disable packet filtering (which may be needed to route the packets to specific EPC bearers), and the EPC may route the packets to one of the bearers moved to (for example, created or configured at) the NR node. While at the UE, packet flow filtering may be applied within a default bearer at the radio protocol stack. When the UE moves back to for example macrocell LTE coverage and releases the secondary NR node, the EPC and UE may switch back to the previously suspended bearers and corresponding packet filtering and bearer separation.

In some example embodiments, the addition of an NR node capable of this functionality may be indicated to the EPC and the UE via for example control plane signaling from MeNB or other node.

Figure 3:
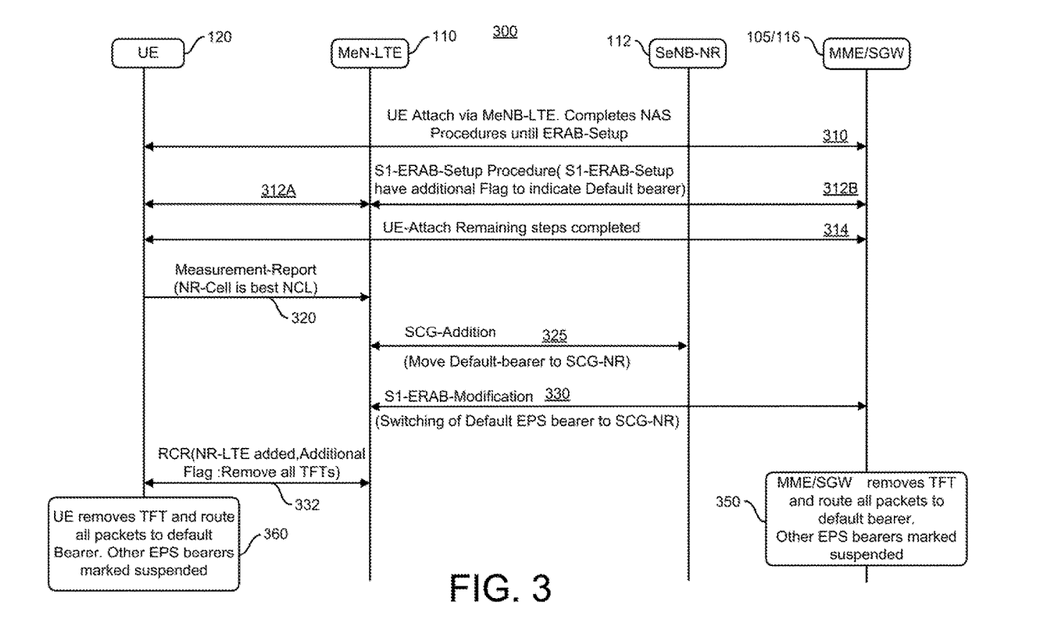
FIG. 3 depicts an example of a signaling diagram supporting new radio node dual connectivity, in accordance with some example embodiments.

At 310, the UE 120 may attach, via the MeNB 110, to the EPC, such as the MME 105 and/or S-GW 116, in accordance with some example embodiments. For example, the UE 120 may perform a non-access stratum (NAS) protocol procedure to MME 105 and/or S-GW 116 (via the control plane and user-plane).

In some example embodiments, the MeNB 110 may be made aware of the NR node 112 being configured to, or capable of, providing QoS flow differentiation. For example, an X2 setup procedure between the NR node 112 and MeNB 110 may indicate to the MeNB 110 that the NR node 112 is able to support dual connectivity and/or provide QoS flow differentiation, in accordance with some example embodiments.

At 312A-B, the EPC may provide additional information in messages, such as an S1-ERAB-Setup message(s). This additional information may be indicative of whether (or not) a bearer is default bearer, in which case the bearer may be flagged (or otherwise indicated) as a default bearer to the MeNB and UE. In the example of FIG. 3, the EPC may setup a plurality of non-GBR bearers, each having a different QoS handling. At 314, the UE may send to the EPC a confirmation message indicative of the completion of the connection and bearer setup. As part of the message sequence 310-314, certain information (which may be used for flow separation at the NR node 112) may also be passed via S1 and X2 interfaces from the MeNB 112 to the NR/SeNB 112, and this information may include QoS policy information for the bearers (although the policy information may be configured via a server (e.g., an operations and maintenance server) as well.

At 320, the UE 120 may send a measurement report to the MeNB 110, and this measurement report may indicate that the NR node 112 is a good candidate for addition to the secondary cell group for dual connectivity.

At 325, the MeNB 110 may switch the default bearer (or any other bearer) as part of SCG/NR node 112 addition. To that end, the MeNB may send, at 330, a message request (e.g., an S1-E-RAB-Modification-Request) to the EPC to switch the default bearer to the NR node. The purpose of this E-RAB modify request is to modify the already established E-RABs for the UE. Moreover, the message request may include additional information indicative of the NR node/SeNB 112 being capable of RAN level handling of QoS flow differentiation.

At 332, the MeNB 110 may send a message such as a confirmation message indicating the NR node 112 has been added to the secondary cell group for dual connectivity, and this message may include an indication, such as a flag, signaling that all TFT (traffic flow templates) have been removed.

At 350, the EPC, such as MME 105 and/or SGW 116, may start switching the packet flow from MeNB EPC bearers towards the SCG bearer, without imposing any EPC packet filtering (e.g., TFTs). The EPC-bearers and/or PDP contexts (which were setup towards the MeNB) may be maintained, by the EPC, in suspended state to enable re-use later should it be needed.

At 360, the UE 120 may start switching the uplink transmission via SCG bearer. In this example, the UE knows it can switch its uplink to NR/SeNB 112 based on the default bearer switching to NR/SeNB 112, which a SCG. EPC-bearers/PDP contexts, at the UE, that were setup in LTE may be kept in suspended state.

Upon release of NR/SeNB 112, the MeNB may update the EPC regarding the UE returning to MeNB. When this is the case, the EPC may again start using the packet filters and start sending downlink packets via the already available EPC bearers. Similarly, the UE may also starts transmission over the switched master cell group (MCG) bearer.

Alternatively or additionally, rather than completely switch the packet flow towards NR-node 112, the EPC may decide, based on QoS policy, that packet transmission may continue via MeNB for some specific EPC bearers (e.g., an IMS-signaling bearer whose reliability is more important).

In some example embodiments, the EPC and UE may route the packets to any of the bearers moved to the SCG including the NR node, so long as the SCG/NR node are capable of, and/or allow, QoS Flow separation. If a default bearer is moved from the EPC to an SCG/NR node, then packets may be routed to default bearer; otherwise packets may be routed to any of the bearer moved to SCG/NR node.

The GBR bearers may require a guaranteed bandwidth and thus fixed resource allocation in both the LTE and NR nodes. As such, when GBR bearers are moved from an LTE eNB base station to NR node, the NR node may also need to know these bearers and reserve resources for them. These bearers may continue as GBR bearers, when moved to the NR node. When these bearers continue as GBR bearers, packet filtering at the EPC and the UE may be configured as follows. If packet filtering results in packets mapping to the GBR bearer, the packets may be sent to GBR bearers; otherwise, the packets may be routed to a single bearer (which may be moved to SCG/NR node) instead of applying additional packet filtering to identify the EPC bearer. Alternatively or additionally, the flow separation switch from the EPC to the NR may be applicable for EPC bearers that are of non-GBR type only. Because the GBR bearers may have to be created in NR node as additional bearer to allow NR node to reserve the required resources, only the packet-filtering meant for routing the non-GBR bearers may be deactivated on entering into NR and activated on moving back to LTE nodes.

Figure 4:
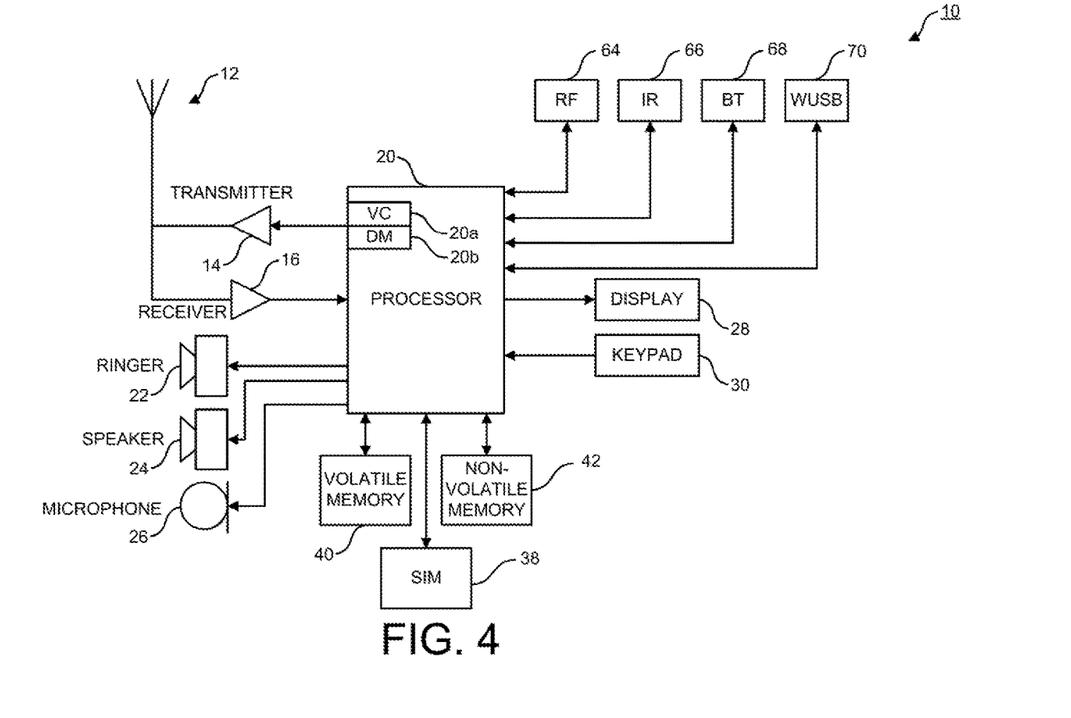
FIG. 4 depicts an example of an apparatus, in accordance with some example embodiments.

FIG. 4 illustrates a block diagram of an apparatus 10, in accordance with some example embodiments. The apparatus 10 (or portions thereof) may be configured to provide a radio, such as user equipment 199 and/or a base station 110 and/or 120. The apparatus may be implemented as any device including a wireless device, a smart phone, a cell phone, a machine type communication device, a wireless sensor, a radio relay, an access point, and/or any other radio including a processor and memory based device.

In some example embodiments, apparatus 10 may be configured to support dual connectivity, which may also include including carrier aggregation. In some example embodiments, apparatus 10 may support bearer formation and QoS flow separation and filtering.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 4 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 4, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein with respect to a user equipment and/or a base station. The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein with respect to the user equipment and/or a base station (see, for example, process 300).

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 4, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is that the EPS bearers setup end-to-end via LTE node may be maintained when NR node is added as SCG instead of releasing and re-establishing these bearers. Without in any way limiting the scope, interpretation, or application of the claims appearing below, a technical effect of one or more of the example embodiments disclosed herein is that latency associated with switching between LTE MeNB and NR/SeNB may be improved.

In some example embodiments, the dual connectivity may be in accordance with 3GPP TS 36.300 V13.2.0 (December 2015), Technical Specification: 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, (Release 13) as well other revisions to this standard as well as other standards. However, the dual connectivity may be in accordance with other standards as well. Moreover, the dual connectivity may include additional connectivity, so it may include connectivity more than two (for example, a single MeNB and a plurality of SeNBs)

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
receiving, at a user equipment, a message indicating to the user equipment that an access node has been added as a secondary base station to provide dual connectivity to the user equipment, the message further indicating to the user equipment that the secondary base station differentiates one or more non-guaranteed bit rate packet flows delivered via a default bearer;
suspending, at the user equipment and in response to receiving the message, at least one bearer and a corresponding quality of service filter;
removing, at the user equipment and in response to receiving the message, at least one traffic flow template;
switching, by the user equipment and in response to receiving the message, non-guaranteed bit rate packets to the default bearer at the added secondary base station; and
reverting, by the user equipment, to the suspended at least one bearer and the corresponding quality of service filter, in response to the added secondary base station being released as a connection at the user equipment.

2. The method of claim 1, wherein the reverting comprises resuming use of the suspended at least one bearer and corresponding quality of service filter to provide quality of service flow differentiation.

3. The method of claim 1, further comprising:
routing, in response to the switching, non-guaranteed bit rate packets to the default bearer at the added secondary base station.

4. The method of claim 1, further comprising:
routing, in response to the reverting, one or more packets to the suspended at least one bearer and corresponding quality of service filter, wherein the suspended at least one bearer is an active bearer.

5. The method of claim 1, further comprising:
storing, by the user equipment, the suspended at least one bearer and corresponding quality of service filter to enable a return to the suspended at least one bearer when the added secondary base station is released.

6. The method of claim 1, wherein the access node comprises a new radio access technology node configured to provide quality of service flow differentiation via the default bearer.

7. The method of claim 1, further comprising:
sending, by the user equipment, a measurement report indicating the access node is a candidate for addition to a secondary cell group for dual connectivity.

8. The method of claim 1, wherein the default bearer comprises a non-guaranteed bit rate bearer.

9. The method of claim 1, wherein the default bearer comprises at least one moved bearer, wherein the at least one moved bearer is moved to and/or created at the secondary base station.

10. An apparatus, comprising:
at least one processor; and
at least one memory including computer program code, the at least one memory and the computer program code configured to, with the at least one processor, cause the apparatus to perform at least the following:
receive a message indicating to the apparatus that an access node has been added as a secondary base station to provide dual connectivity to the apparatus, the message further indicating to the apparatus that the secondary base station differentiates one or more non-guaranteed bit rate packet flows delivered via a default bearer;
suspend, in response to the message being received, at least one bearer and corresponding quality of service filter;
remove, in response to the message being received, at least one traffic flow template;
switch, in response to the message being received, non-guaranteed bit rate packets to the default bearer at the added secondary base station; and
revert to the suspended at least one bearer and corresponding quality of service filter, in response to the added secondary base station being released as a connection at the apparatus.

11. The apparatus of claim 10, wherein the revert comprises a resumption of use of the suspended at least one bearer and corresponding quality of service filter to provide quality of service flow differentiation.

12. The apparatus of claim 10, wherein the apparatus is further caused to at least route, in response to the switch, non-guaranteed bit rate packets to the default bearer at the added secondary base station.

13. The apparatus of claim 10, wherein the apparatus is further caused to at least route, in response to the revert, one or more packets to the suspended at least one bearer and corresponding quality of service filter, wherein the suspended at least one bearer is an active bearer.

14. The apparatus of claim 10, wherein the apparatus is further caused to at least store the suspended at least one bearer and corresponding quality of service filter to enable a return to the suspended at least one bearer when the added secondary base station is released.

15. The apparatus of claim 10, wherein the access node comprises a new radio access technology node configured to provide quality of service flow differentiation via the default bearer.

16. The apparatus of claim 10, wherein the apparatus is further caused to at least send a measurement report indicating the access node is a candidate for addition to a secondary cell group for dual connectivity.

17. The apparatus of claim 10, wherein the default bearer comprises a non-guaranteed bit rate bearer.

18. The apparatus of claim 10, wherein the default bearer comprises at least one moved bearer, wherein the at least one moved bearer is moved to and/or created at the secondary base station.

* * * * *